Patented Oct. 28, 1952

2,615,867

UNITED STATES PATENT OFFICE 2,615,867

COPOLYMERS OF VINYLIDENE CYANIDE WITH VINYL ESTERS OF AROMATIC ACIDS

Harry Gilbert, Cuyahoga Falls, and Floyd F. Miller, Akron, Ohio, assignors to The B. F. Goodrich Company, New York, N. Y., a corporation of New York No Drawing. Application September 13, 1949, Serial No. 115,563

7 Claims. (Cl. 260—78.5)

This invention relates to the preparation of novel copolymers of vinylidene cyanide and vinyl esters of organic monocarboxylic acids, which copolymers are extremely useful in the preparation of filaments and films.

In U. S. Patent 2,476,270 to Alan E. Ardis, and in copending applications, Serial No. 63,434, filed December 3, 1948, now U. S. Patent 2,502,412, and Serial No. 79,712, filed March 4, 1949, now U. S. Patent 2,514,387, novel methods for the preparation of monomeric vinylidene cyanide are disclosed. In another copending application, Serial No. 11,336, filed February 26, 1948, methods for the preparation of useful homopolymers of vinylidene cyanide are disclosed.

Monomeric vinylidene cyanide is a clear liquid at room temperature and a crystalline solid at 0° C. It melts in the range of 6.0° C. to 9.7° C., depending on purity, with purest samples melting at 9.0° C. to 9.7° C., and it boils at 40° C. at a reduced pressure of 5 mm. of mercury. It is quite unstable because of its extreme sensitivity to water, undergoing on contact with water at room temperature an instantaneous homopolymerization reaction to give a solid, water-insoluble resin. When it is allowed to stand at room temperature in admixture with butadiene-1,3, it reacts therewith to give solid 4,4-dicyanocyclohexene.

It has now been discovered that monomeric vinylidene cyanide of the above physical and chemical characteristics will copolymerize with vinyl esters of aromatic monocarboxylic acids in the presence of a free radical catalyst to give new and highly useful copolymers. It has also been discovered that when the polymerization is carried out in such manner that the charge contains from ½ to 90 mole percent of vinylidene cyanide, the copolymers obtained are even further unique in that they are essentially 1:1 alternating copolymers, that is, copolymers possessing the structure:

—M₁—M₂(M₁—M₂)ₓM₁—M₂— wherein each M₁ is a vinylidene cyanide unit

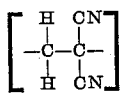

and each M₂ is a unit of a vinyl ester of an aromatic monocarboxylic acid

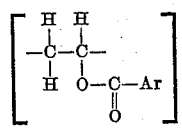

and $x$ is any number, preferably from 100 to 20,000. The fact that the copolymers obtained when the specific vinylidene cyanide charging ratio is used are essentially 1:1 alternating copolymers is determined by analysis of the copolymer and by the following copolymerization equation of F. N. Lewis, C. Walling et al., Journal of the American Chemical Society, 70, 1519 (1948):

$$\frac{d(M_1)}{d(M_2)} = \frac{(M_1)}{(M_2)} \cdot \frac{r_1(M_1)+(M_2)}{r_2(M_2)+(M_1)}$$

wherein ($M_1$) = concentration of unreacted monomer $M_1$
($M_2$) = concentration of unreacted monomer $M_2$
$r_2$ = ratio of the rate constants for the reaction of an $M_1$ type radical with $M_1$ and $M_2$ respectively
$r_2$ = ratio of the rate constants for the reaction of an $M_2$ type radical with $M_2$ and $M_1$ respectively.

When the product of $r_1$ and $r_2$ (the values of $r_1$ and $r_2$ being determined by solving the equation for $r_1$ and $r_2$) is equivalent to zero, a 1:1 alternating copolymer is formed, that is, a copolymer having the

—M₁—M₂(M₁—M₂)ₓM₁—M₂— structure shown hereinabove for the copolymers of vinylidene cyanide with vinyl esters of aromatic monocarboxylic acids. That these copolymers possess the 1:1 alternating structure is demonstrated by the fact that when $M_1$ is vinylidene cyanide and $M_2$=vinyl benzoate, $r_1$=0.0261 and $r_2$=0.00262; therefore the product of $r_1$ and $r_2$ is 0.000068, which is, of course, substantially equivalent to zero.

It is highly surprising that vinylidene cyanide will polymerize with vinyl esters of aromatic monocarboxylic acids, especially to give the essentially 1:1 alternating copolymers, since almost without exception monomer pairs exhibit a very strong tendency to polymerize randomly, as is the case in the present invention when the charge contains less than ½ or more than 90 mole percent of vinylidene cyanide rather than to form the alternating type copolymer, this being especially true of vinyl and vinylidene compounds.

The vinyl esters which are polymerized with vinylidene cyanide in accordance with this invention possess the structure

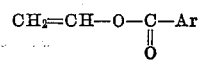

wherein Ar is an aromatic radical in which all the hydrogen atoms are attached to carbon atoms. Because of its low cost and the fact that it may be readily obtained in commercial quantities, vinyl benzoate is the preferred monomer for use in the polymerization with vinylidene cyanide. However, other monomers of the above general class are also polymerized with vinylidene cyanide with good results. Among such other monomers are homologs of vinyl benzoate of the formula

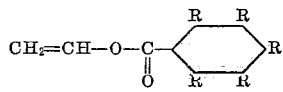

wherein each R is a member of the class consisting of hydrogen atoms or lower alkyl radicals, for example vinyl toluate (which may be prepared according to the method of U. S. Patent 2,411,962) and the like;

Monomers of the above general class wherein the aromatic radical is halogen substituted, such as vinyl p-chlorobenzoate, vinyl o-chlorobenzoate, vinyl m-chlorobenzoate, vinyl o-bromobenzoate and similar vinyl halobenzoates, all of which may be prepared by the method of U. S. Patent 2,465,316;

Monomers of the above general class wherein the aromatic radical is alkoxy substituted, for example, vinyl p-methoxybenzoate, vinyl o-methoxybenzoate, vinyl p-ethoxybenzoate and similar vinyl alkoxy benzoates which may be prepared according to the method of U. S. Patent 2,465,317.

The polymerization itself may be carried out in several different ways. One preferred method consists in first dissolving the vinylidene cyanide and the vinyl ester in benzene or other aromatic solvent such as toluene, methyl toluene, trichloro benzene, or the like, preferably free from impurities which initiate the ionic polymerization of the monomer, and in an amount such that the solvent comprises approximately 30 to 80% by weight of the total solution. A polymerization catalyst is included in this solution and the resulting mixture is maintained at a temperature of about 20° C. to 100° C., whereupon polymerization occurs to form the desired copolymer as a white powder of small particle size. The copolymer thus formed may be separated from the polymerization medium simply by filtering, or if desired the polymerization medium may be removed by evaporation.

A second method of polymerization consists in agitating the monomers in a liquid aliphatic hydrocarbon (which are non-solvents for vinylidene cyanide), for example, hexane or heptane, in the presence of a polymerization catalyst, whereupon the copolymer forms and may be separated from the polymerization medium by filtering or by evaporating the medium. It is important when utilizing this method of polymerization that the liquid aliphatic hydrocarbon must be free from impurities which initiate the ionic polymerization of vinylidene cyanide.

Alternatively, the polymerization may be carried out without the use of a solvent or other liquid medium for the monomers, that is, simply by heating and agitating a mixture of the monomers and polymerization catalyst to effect the polymerization. Also, the polymerization may be effected at temperatures as low as 0° C. or lower or as high as 100° C. or even higher provided a catalyst is utilized which will dissociate into free radicals at the polymerization temperature.

It is to be understood, of course, that regardless of the polymerization method utilized, the polymerization should be stopped before either of the monomers is entirely consumed, in order that an essentially 1:1 alternating copolymer will be obtained. Otherwise, when either of the monomers is completely used up, the product will contain straight polymer obtained by polymerization of the remaining monomer. Accordingly, it is often desirable to add, continuously or intermittently, fresh quantities of one or both of the monomers, and also of catalyst and solvent, if desired, to the polymerization mixture during the course of the polymerization, thus taking fullest advantage of the capacity of the equipment and in effect operating a continuous or semi-continuous process.

The catalyst which is used in the polymerization is preferably a peroxygen compound such as silver peroxide, the perborates, the percarbonates, benzoyl peroxide, caproyl peroxide, lauroyl peroxide, acetone peroxide, acetyl benzoyl peroxide, cumene hydroperoxide, o,o'-dichlorobenzoyl peroxide, o,o'-dibromobenzoyl peroxide, caprylyl peroxide, pelargonyl peroxide, tertiary butyl hydroperoxide, tetralin peroxide, and the like. In general, from 0.01 to 0.1% by weight of the catalyst is utilized, although smaller or larger amounts may be utilized if desired. By regulating the amount of the catalyst it is possible to control very accurately the molecular weight of the copolymer. For instance, to obtain a high molecular weight copolymer, a small quantity of catalyst is used, while lower molecular weight copolymers are obtained by the use of larger amounts of catalyst.

The following examples illustrate the preparation of copolymers of vinylidene cyanide and vinyl esters of aromatic monocarboxylic acids in accordance with this invention, but are not to be construed as a limitation upon the scope thereof, for there are, of course, numerous possible variations and modifications. In the examples all parts are by weight.

Examples I to VI

A series of six vinylidene cyanide-vinyl benzoate copolymers is prepared by adding the monomers to benzene (except in Example VI where no solvent is used), adding o,o'-dichlorobenzoyl peroxide as the polymerization catalyst and heating the resulting solution to about 43° C. whereupon polymerization occurs to form essentially 1:1 alternating copolymers. After 17 hours in Examples I to V and 45 minutes in Example VI the copolymer is removed by filtering. The charging rates of the monomers and catalyst, the percent nitrogen in the copolymer and the mole percentage of vinylidene cyanide in the copolymer are recorded in the following table:

|  | Ex. I | Ex. II | Ex. III | Ex. IV | Ex. V | Ex. VI |
| --- | --- | --- | --- | --- | --- | --- |
| Parts benzene | 23.7 | 22.0 | 17.4 | 13.3 | 8.6 | 0.0 |
| Parts vinylidene cyanide | 0.436 | 1.36 | 2.0 | 2.46 | 2.37 | 4.0 |
| Mole percent vinylidene cyanide | 10.0 | 30.0 | 50.0 | 70.0 | 90.0 | 50.0 |
| Parts vinyl benzoate | 7.5 | 6.0 | 3.8 | 2.0 | 0.5 | 7.6 |
| Mole percent vinyl benzoate | 90.0 | 70.0 | 50.0 | 30.0 | 10.0 | 50.0 |
| Parts catalyst | 0.0079 | 0.0074 | 0.0058 | 0.0045 | 0.0029 | 0.012 |
| Weight percent catalyst per monomers | 0.1 | 0.1 | 0.1 | 0.1 | 0.1 | 0.1 |
| Percent N in copolymer | 11.87 | 12.65 | 13.41 | 13.70 | 15.62 | 13.9 |
| Mole percent vinylidene cyanide in copolymer | 48.4 | 50.9 | 53.1 | 54.2 | 59.5 | 54.5 |
| Conversion (based on total weight of monomers charged) | 13.0 | 17.0 | 17.0 | 15.0 | 5.6 | 5.1 |

When other vinyl esters of aromatic monocarboxylic acids selected from those disclosed hereinabove are substituted for vinyl benzoate in the above examples, the copolymers obtained possess properties generally equivalent to the vinylidene cyanide-vinyl benzoate copolymers. Likewise, when the polymerization is carried out according to the other methods described hereinabove, or using other of the peroxygen catalysts disclosed, excellent results are achieved.

The copolymers which are prepared according to this invention are characterized by being soluble in dimethyl formamide, a mixture of dimethyl formamide and acetone, and hot cyclohexanone. They are insoluble in boiling acetone, alcohols, benzene, ethers and hot dioxane.

As disclosed hereinabove, the copolymers of this invention are extremely valuable in the preparation of solutions from which can be spun filaments of any desired size having unusually high tensile strengths, excellent resistance to the action of alkalis and acids, as well as many other advantageous properties. For example, a solution of the copolymer obtained in Example I in dimethyl formamide is prepared and spun through a spinneret into a water bath and "hot stretched" by a method whereby the filament is stretched in a hot zone in a series of steps, a process disclosed in a copending application, Serial No. 113,018, filed August 29, 1949. The filament thus prepared has a high tensile strength, low elongation at break and is neither acid nor alkaline sensitive. In addition to the use of dimethyl formamide as the solvent for the copolymer, other of the solvents listed in the foregoing paragraph may also advantageously be used. Also, since the copolymers of this invention are characterized by having a definite softening point, they are useful in the preparation of molded objects, and may be melt spun or cast into excellent films.

Although specific examples of the invention have been herein described, it is not intended to limit the invention solely thereto, but to include all of the variations and modifications falling within the spirit and scope of the appended claims.

We claim:

1. A copolymer of monomeric vinylidene cyanide and a vinyl ester of the formula

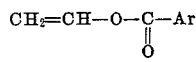

wherein Ar is an aromatic radical in which all the hydrogen atoms are attached to carbon atoms, said copolymer possessing essentially the structure

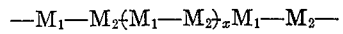

wherein each $M_1$ represents the vinylidene cyanide unit of the structure

each $M_2$ represents a vinyl ester unit of the structure

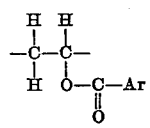

and $x$ represents a number, said copolymer being a resinous, heat-softenable solid which is soluble at room temperature in dimethyl formamide, but which is insoluble at room temperature in each of acetone, alcohol, benzene, and ether, the monomeric vinylidene cyanide entering into said copolymer to produce the vinylidene cyanide units being a liquid at room temperature and a crystalline solid at 0° C., having a melting point when in purest form of substantially 9.0° C. to 9.7° C. and being characterized chemically by the ability to undergo on contact with water at room temperature an instantaneous homopolymerization reaction to give a solid water-insoluble resin, and by the ability to react at room temperature with butadiene-1,3 to give solid 4,4-dicyanocyclohexene.

2. The copolymer of claim 1, wherein the vinyl ester is vinyl benzoate.

3. The method which comprises preparing a liquid medium containing liquid monomeric vinylidene cyanide, said monomeric vinylidene cyanide being characterizable chemically by the ability to undergo on contact with water at room temperature an instantaneous homopolymerization reaction to give a solid, water-insoluble resin, admixing said liquid medium with a vinyl ester of the formula

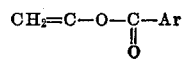

wherein Ar is an aromatic radical in which all the hydrogen atoms are attached to carbon atoms, in an amount such that the mixture contains from ½ to 90 mole per cent monomeric vinylidene cyanide, and with a peroxygen catalyst, thereby to form a solid, resinous copolymer of vinylidene cyanide and said vinyl ester, said copolymer possessing essentially the structure

wherein each $M_1$ represents the vinylidene cyanide unit of the structure

and each $M_2$ represents the unit of the vinyl ester of the structure

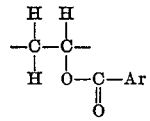

and $x$ represents a number.

4. The method of claim 3 wherein the liquid medium containing monomeric vinylidene cyanide consists of monomeric vinylidene cyanide dissolved in an organic solvent which is inert thereto.

5. The method of claim 4 wherein the organic solvent is a liquid hydrocarbon.

6. The method of claim 5 wherein the liquid hydrocarbon solvent is benzene, the vinyl ester is vinyl benzoate, and the peroxygen catalyst is o,o'-dichlorobenzoyl peroxide.

7. A synthetic filament comprising a copolymer of vinylidene cyanide and vinyl benzoate, said copolymer possessing essentially the structure

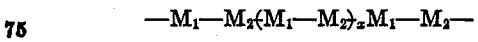

wherein each $M_1$ is a vinylidene cyanide unit, each $M_2$ is a unit of vinyl benzoate, and $x$ is a number, the vinylidene cyanide units being derived from the monomeric vinylidene cyanide which is a liquid at room temperature and a crystalline solid at 0° C., having a melting point when in purest form of substantially 9.0° C. to 9.7° C. and being characterized chemically by the ability to undergo on contact with water at room temperature an instantaneous homopolymerization reaction to give a solid, water-insoluble resin, said copolymer being soluble at room temperature in dimethyl formamide, but insoluble in acetone, alcohol, benzene and ether.

HARRY GILBERT.
FLOYD F. MILLER.

REFERENCES CITED

The following references are of record in the file of this patent:

UNITED STATES PATENTS

| Number | Name | Date |
|---|---|---|
| 2,436,926 | Jacobson | Mar. 2, 1948 |
| 2,466,395 | Dickey | Apr. 5, 1949 |